United States Patent Office 2,734,075
Patented Feb. 7, 1956

2,734,075

α,α-DICHLOROPROPIONIC ACID ESTERS OF THE POLYHYDRIC ALCOHOLS

Harry F. Brust and Herman O. Senkbeil, Midland, Mich., assignors to The Dow Chemical Company, Midland, Mich., a corporation of Delaware No Drawing. Application April 6, 1953,
Serial No. 347,183

6 Claims. (Cl. 260—487)

The present invention relates to the α,α-dichloropropionic acid esters of the polyhydric alcohols. These compounds are viscous liquids or crystalline solids somewhat soluble in many organic solvents and substantially insoluble in water. They have been found to be active as plant growth control materials and are adapted to be employed in dust and spray compositions for the control of the growth and the killing of weeds and for the sterilization of soil with regard to plant growth.

The new compounds may be prepared by reacting together (1) α,α-dichloropropionic acid and (2) a polyhydric alcohol such as ethylene glycol, propylene glycol, butylene glycol, glycerol, erythritol, penta-erythritol and the di- and tri-alkylene glycols of the ethylene, propylene and trimethylene series, i. e. diethylene glycol, triethylene glycol, dipropylene glycol, tripropylene glycol, di(trimethylene) glycol, tri(trimethylene) glycol, hydroxyethoxypropanol, hydroxyethoxy-ethoxy-propanol, hydroxyethoxy-propoxy-propanol, hydroxypropoxy-ethoxypropanol, and hydroxyethoxy-propoxy-ethanol. Good results are obtained when the α,α-dichloropropionic acid is reacted with an equivalent proportion of the polyhydric alcohol, i. e. when stoichiometric proportions of the reagents are employed. However, a large excess of the acid or a small excess of the polyhydric alcohol may be employed in the reaction mixture. Such excess does not appreciably affect the course of the reaction. The reaction may be carried out in the presence of an esterification catalyst such as sulfuric acid and conveniently in a water-immiscible solvent such as ethylene dichloride, monochlorobenzene or toluene. The removal from the reaction zone of the water of reaction as formed, generally results in optimum yields of the desired ester products.

In carrying out the reaction, the α,α-dichloropropionic acid, polyhydric alcohol and catalyst, if employed, are mixed together and the resulting mixture heated at a temperature of from 75° to 180° C. for a period of time to complete the reaction. When operating at temperatures above the boiling temperature of water, the heating may be carried out under somewhat diminished pressure to remove the water of reaction as formed. In an alternative method, the α,α-dichloropropionic acid, polyhydric alcohol and catalyst, if employed, may be dispersed in an inert organic solvent and the resulting mixture heated at the boiling temperature. During the reaction a mixture of solvent and water of reaction may be continuously distilled out of the reaction vessel, condensed and the solvent recovered. Additional solvent may be introduced into the reaction zone as may be necessary.

Upon completion of the reaction, the desired product may be separated by fractional distillation under reduced pressure. When the desired product precipitates as a crystalline solid in the cooled reaction mixture or in the reaction residue to be obtained following removal of the reaction solvent, this solid product may be separated in an alternative method by filtration and thereafter purified by recrystallization from various organic solvents. In another method of separation and purification, the solvent mixture of the reaction product is neutralized with an alkali such as dilute aqueous sodium carbonate. The resulting mixture divides into aqueous and solvent layers. The solvent layer, which contains the ester product, is separated, washed several times with water to extract the water soluble salts of catalyst and any unreacted α,α-dichloropropionic acid. The washed mixture may be fractionally distilled under reduced pressure to separate the desired ester compound.

The following examples illustrate the invention but are not to be construed as limiting:

Example 1

93 grams (1.5 moles) of ethylene glycol and 444 grams (3.1 moles) of α,α-dichloropropionic acid were mixed together and the mixture thereafter heated for 0.5 hour at a temperature of about 125° C. The reaction mixture was then placed under reduced pressure and the temperature gradually increased up to 160° C. to distill off water of reaction as formed until no further substantial amounts of water were liberated. The resulting mixture was then fractionally distilled under reduced pressure to obtain an ethylene glycol bis(α,α-dichloropropionate) product as a viscous liquid boiling at 125°–129.5° C. at 2.2-millimeters pressure and freezing at 16° C.

Example 2

114 grams (1.5 moles) of 1,3-propanediol and 429 grams (3 moles) of α,α-dichloropropionic acid were dispersed in 300 milliliters of ethylene dichloride and the resulting mixture heated for about 40 hours at a temperature of from 100° to 121° C. The heating was carried out with continuous distillation of ethylene dichloride together with the water of reaction as formed, separation of the water and recycling of ethylene dichloride. The resulting reaction mixture was then fractionally distilled under reduced pressure to obtain a 1,3-propanediol bis(α,α-dichloropropionate) product as a viscous liquid boiling at 120°–123° C. at 1 millimeter pressure and having a refractive index n/D of 1.4711 at 25° C.

Example 3

1.5 moles of 1,2-propanediol and 3 moles of α,α-dichloropropionic acid were dispersed in 300 milliliters of ethylene dichloride and the resulting mixture heated for about 22 hours at a temperature of from 98° to 105° C. The latter operation was carried out with the continuous distillation of ethylene dichloride together with the water of reaction as formed, separation of the water and the recycling of the ethylene dichloride. The mixture was then fractionally distilled under reduced pressure to obtain a 1,2-propanediol bis(α,α-dichloropropionate) product as a viscous liquid boiling at 127°–134° C. at 2 millimeters pressure.

Example 4

One mole of 1-(2-hydroxyethoxy)-2-propanol and 2 moles of α,α-dichloropropionic acid are dispersed in 350 milliliters of ethylene dichloride and the resulting mixture heated at the boiling temperature for about 20 hours. The heating is carried out with continuous distillation of entraining agent and water of reaction as previously described. Following the heating period, the mixture is fractionally distilled under reduced pressure to obtain a 1-(2-hydroxyethoxy)-2-propanol bis(α,α-dichloropropionate product as a viscous liquid.

Example 5

134.2 grams (1 mole) of a dipropylene glycol (having a refractive index n/D of 1.439 at 25° C. and containing about 60 percent 2-(2-hydroxypropoxy)-1-propanol, 35 percent 1-(2-hydroxypropoxy)-2-propanol and 5 percent 2-(2-hydroxy-1-methylethoxy)-1-propanol) and 286 grams (2 moles) of α,α-dichloropropionic acid were dispersed in 200 milliliters of ethylene dichloride and the resulting mixture heated at a temperature of from 119° to 143° C. for about 38 hours. The heating was carried out in the usual fashion and the mixture thereafter fractionally distilled under reduced pressure to obtain a mixed ester product consisting essentially of 2-(2-hydroxypropoxy)-1 - propanol bis($\alpha,\alpha$-dichloropropionate) and 1-(2-hydroxy-propoxy)-2-propanol bis($\alpha,\alpha$-dichloropropionate). This product was a viscous liquid boiling at 128°–133° C. at 1 millimeter pressure and having a refractive index $n/D$ of 1.4624 at 25° C.

*Example 6*

75 grams (0.5 mole) of triethylene glycol (boiling at about 287° C. at 760 millimeters pressure) and 147 grams (1.025 moles) of $\alpha,\alpha$-dichloropropionic acid were dispersed in 200 milliliters of ethylene dichloride and the resulting mixture heated at a temperature of from 100° to 111° C. for about 20 hours. The heating was carried out with continuous distillation of ethylene dichloride together with recycling of the entraining agent. Upon completion of the reaction, the mixture was fractionally distilled under reduced pressure to obtain a triethylene glycol bis($\alpha,\alpha$-dichloropropionate) product as a viscous liquid boiling at 190°–195° C. at 4 millimeters pressure and having a molecular weight of 400.

*Example 7*

90 grams (1 mole) of 2,3-butanediol and 286 grams (2 moles) of $\alpha,\alpha$-dichloropropionic acid were dispersed in 200 milliliters of ethylene dichloride and the resulting mixture heated in the previously described manner for about 38 hours at a temperature of from 112° to 131° C. Following the heating period, the mixture was fractionally distilled under reduced pressure to obtain a 2,3-butanediol bis($\alpha,\alpha$-dichloropropionate) product as a viscous liquid. The latter had a refractive index $n/D$ of 1.4620 at 25° C.

*Example 8*

One mole of tri(trimethylene) glycol and 2 moles of $\alpha,\alpha$-dichloropropionic acid are reacted together in 300 milliliters of ethylene dichloride as described in Example 2 to prepare a tri(trimethylene) glycol bis ($\alpha,\alpha$-dichloropropionate) product as a viscous liquid.

*Example 9*

136 grams (1 mole) of penta-erythritol and 629 grams (4.4 moles) of $\alpha,\alpha$-dichloropropionic acid were dispersed in 300 milliliters of ethylene dichloride and the resulting mixture heated in the usual fashion for about 39 hours at a temperature of from 110° to 120° C. The ethylene dichloride was then recovered from the mixture by distillation to obtain a penta-erythritol tetrakis($\alpha$-$\alpha$-dichloropropionate) product as a crystalline residue melting at 116° to 120° C.

*Example 10*

In a similar manner an erythritol tetrakis($\alpha,\alpha$-dichloropropionate) product may be prepared by reacting together 1 mole of erythritol and 4 moles of $\alpha,\alpha$-dichloropropionic acid.

*Example 11*

93 grams (1 mole) of glycerol and 437 grams (3.05 moles) of $\alpha,\alpha$-dichloropropionic acid were dispersed in 300 milliliters of ethylene dichloride and the resulting mixture heated for about 46 hours at a temperature of from 113° to 142° C. The heating was carried out in the usual manner with continuous distillation of entraining agent. The reaction mixture was then fractionally distilled under reduced pressure to obtain a glycerol tri-($\alpha,\alpha$-dichloropropionate) product as a viscous liquid boiling at 167° to 170° C. at 0.4 to 0.6 millimeter pressure.

The new $\alpha,\alpha$-dichloropropionic acid esters have been tested and found effective as herbicides, i. e. for the killing of weeds. For such use the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of oil-in-water emulsions or water dispersions with or without the addition of wetting, dispersing or emulsifying agent.

The di- and tri-ethylene glycols employed as starting materials as previously described may be prepared by reacting ethylene glycol with ethylene oxide. The reaction may be carried out in the presence of a catalyst such as sulfuric acid or sodium hydroxide. In one such method, the reactants are mixed together in the presence of the catalyst and heated for about 0.5 hour at a temperature of 170° C. and a pressure of 200 pounds per square inch. The individual glycols can then be separated by subjecting the mixed reaction product to fractional distillation under reduced pressure.

1-(2-hydroxypropoxy)-2-propanol may be similarly prepared by reacting 1,2-propanediol with propylene oxide in the presence of sodium hydroxide, since propylene oxide reacts much faster with a primary alcohol than with a secondary alcohol, and in the presence of the alkaline catalyst, the oxide adds largely as a secondary alcohol. 2-(2-hydroxypropoxy)-1-propanol may be prepared by reacting 1-methoxy-2-propanol with propylene oxide in the presence of an alkaline catalyst to produce 1-(2-methoxyisopropoxy)-2-propanol. The latter product is thereafter heated with hydrogen bromide to give the desired dipropylene glycol and methyl bromide. 2-(2-hydroxy-1-methylethoxy)-1-propanol may be prepared by the reduction of diethyl dilactylate with lithium aluminum hydride (LiAlH$_4$). The trialkylene glycols of the propylene series may be prepared by reacting these dipropylene glycols with propylene oxide in the presence of sodium hydroxide as catalyst. The term "alkylene" as employed in the present specification refers to any bivalent aliphatic hydrocarbon radical having two free valences attached to different carbon atoms. The polyhydric alcohols to be employed in accordance with the teachings of the specification and claims are those alcohols which are free of reactive groups other than hydroxyl.

The di- and tri-alkylene glycols of the tri-methylene series may be prepared by heating 1,3-propanediol with a dehydration catalyst such as iodine. The heating is carried out at a temperature of about 175° C. and with the continuous distillation and collection of water of reaction. Upon completion of the reaction as evidenced by the amount of water collected, the mixture may be extracted with a suitable organic solvent and the solvent extract fractionally distilled under reduced pressure to obtain the desired product.

The glycol-ethers containing mixed alkylene units may be prepared by reacting a propanediol, dipropylene glycol or di(trimethylene) glycol and ethylene oxide in the presence of sodium hydroxide. In a similar manner, other mixed glycol ethers may be prepared by reacting diethylene glycol or a mixed glycol-ether with propylene oxide. Other of the mixed glycol-ethers may be prepared by reacting 1,3-propanediol with mixed glycol-ethers or suitable unmixed dialkylene glycols in the presence of iodine as catalyst.

We claim:

1. A fully esterified reaction product of $\alpha,\alpha$-dichloropropionic acid with an aliphatic polyhydric alcohol.
2. Ethylene glycol bis($\alpha,\alpha$-dichloropropionate).
3. 1,2-propanediol bis($\alpha,\alpha$-dichloropropionate).
4. Dipropylene glycol bis($\alpha,\alpha$-dichloropropionate).
5. Penta-erythritol tetrakis($\alpha,\alpha$-dichloropropionate).
6. Glycerol tri($\alpha,\alpha$-dichloropropionate).

References Cited in the file of this patent

UNITED STATES PATENTS 2,257,021  Pollack _____ Sept. 23, 1941